M. VON RECKLINGHAUSEN, A. HELBRONNER & V. HENRI.
STERILIZATION OF LIQUIDS.
APPLICATION FILED DEC. 21, 1912.

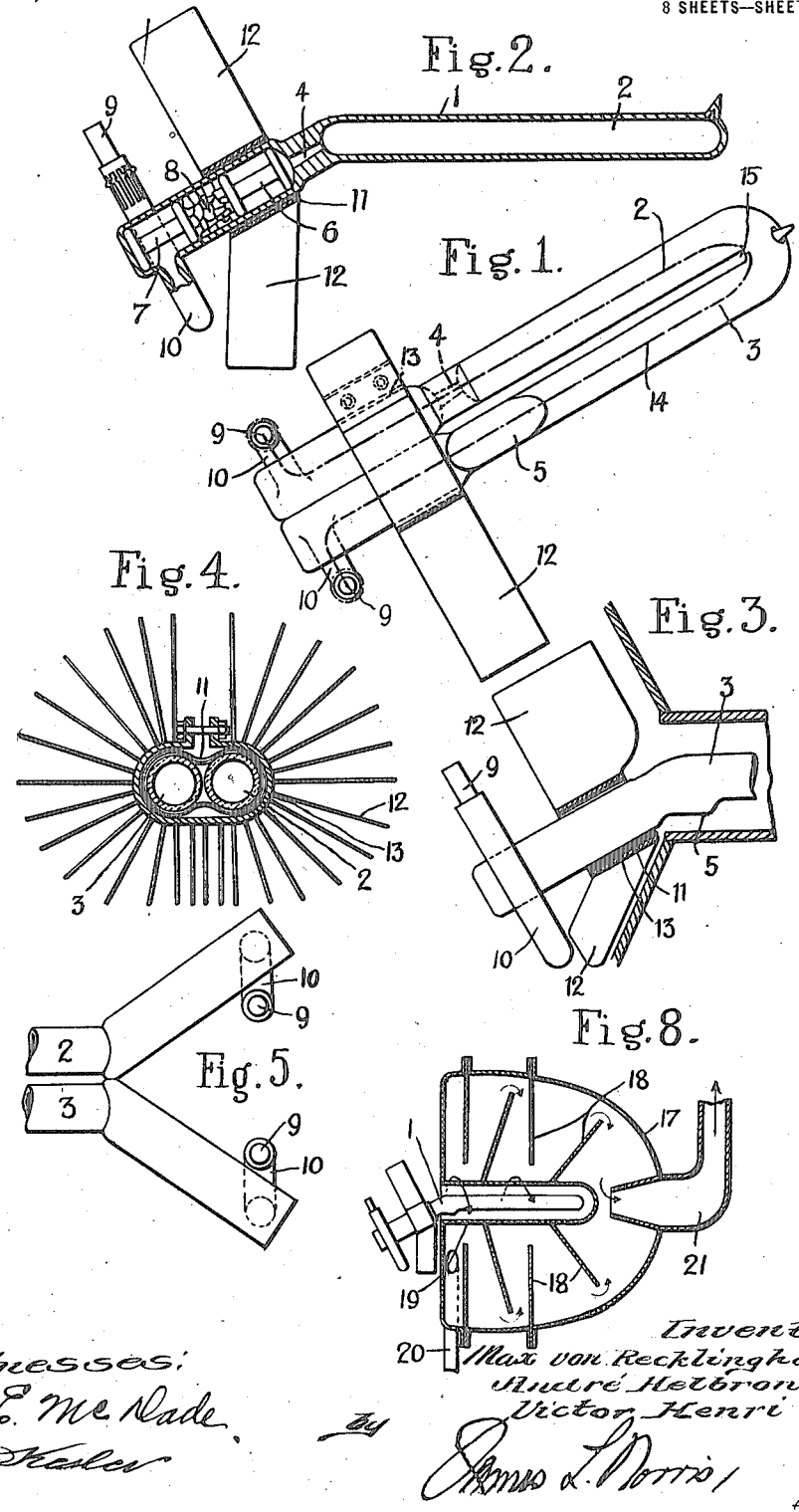

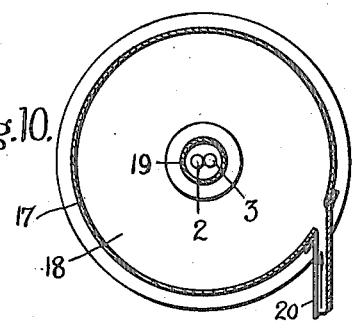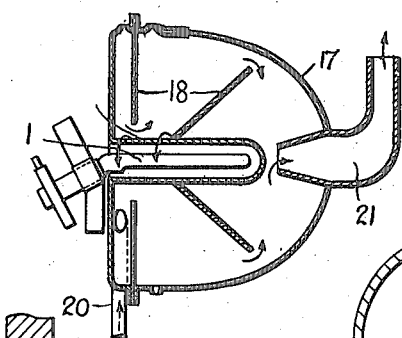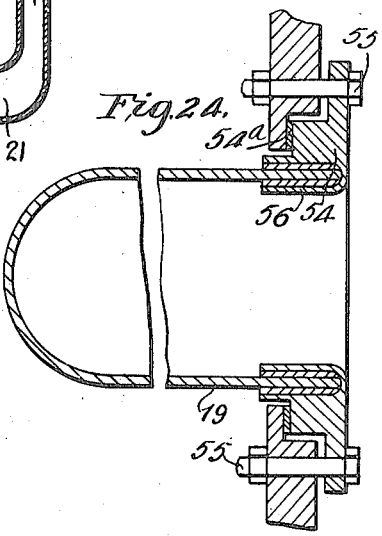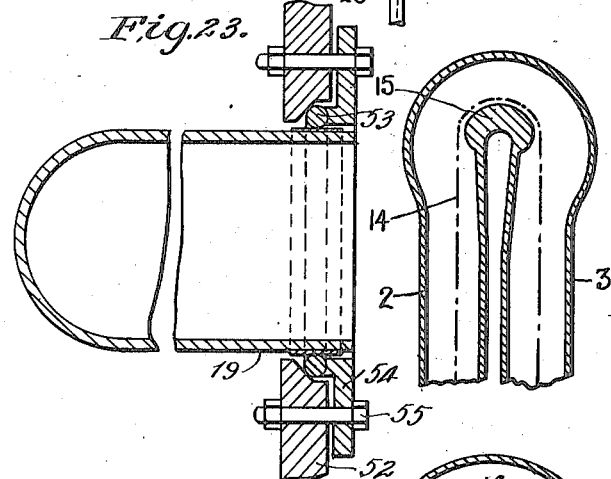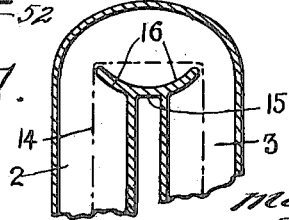

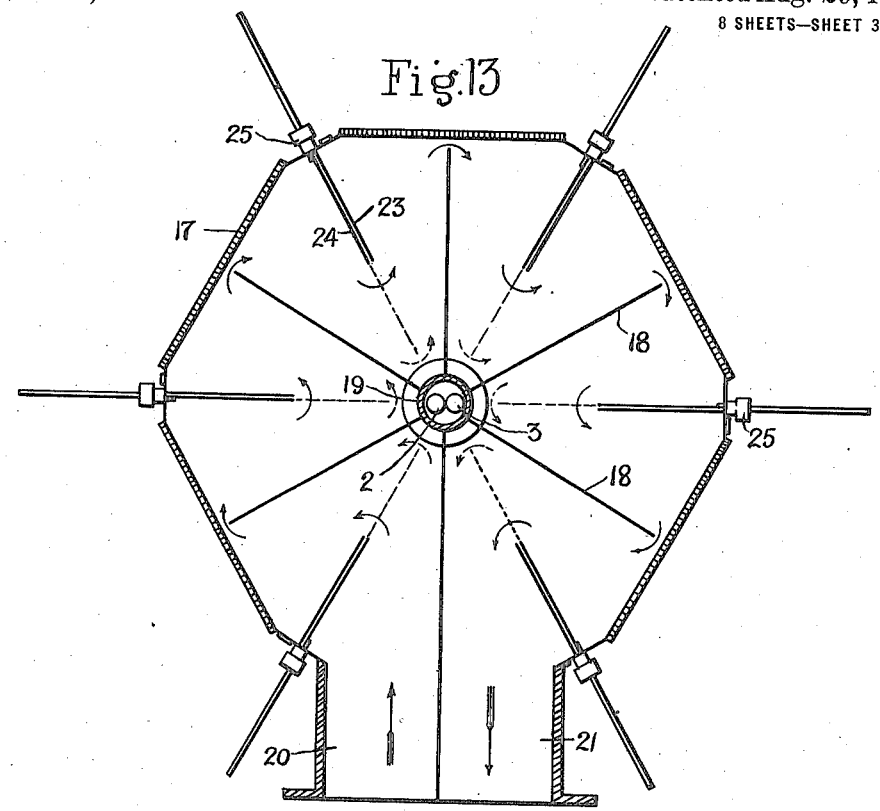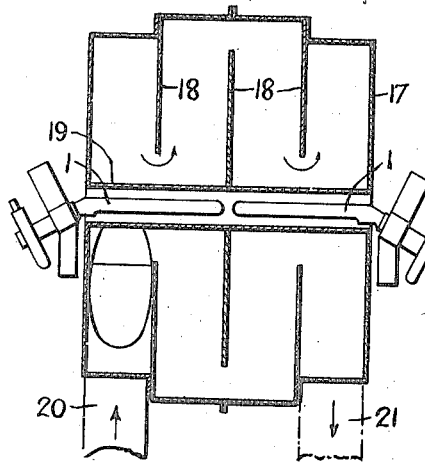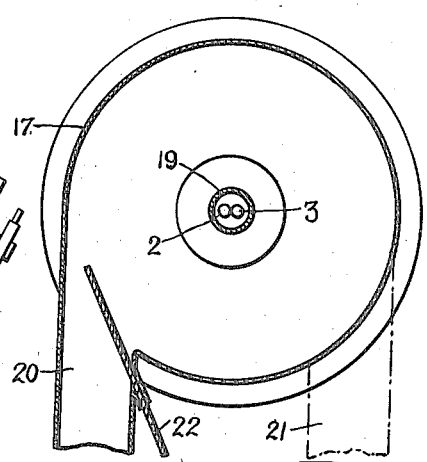

1,196,481.

Patented Aug. 29, 1916.
8 SHEETS—SHEET 5.

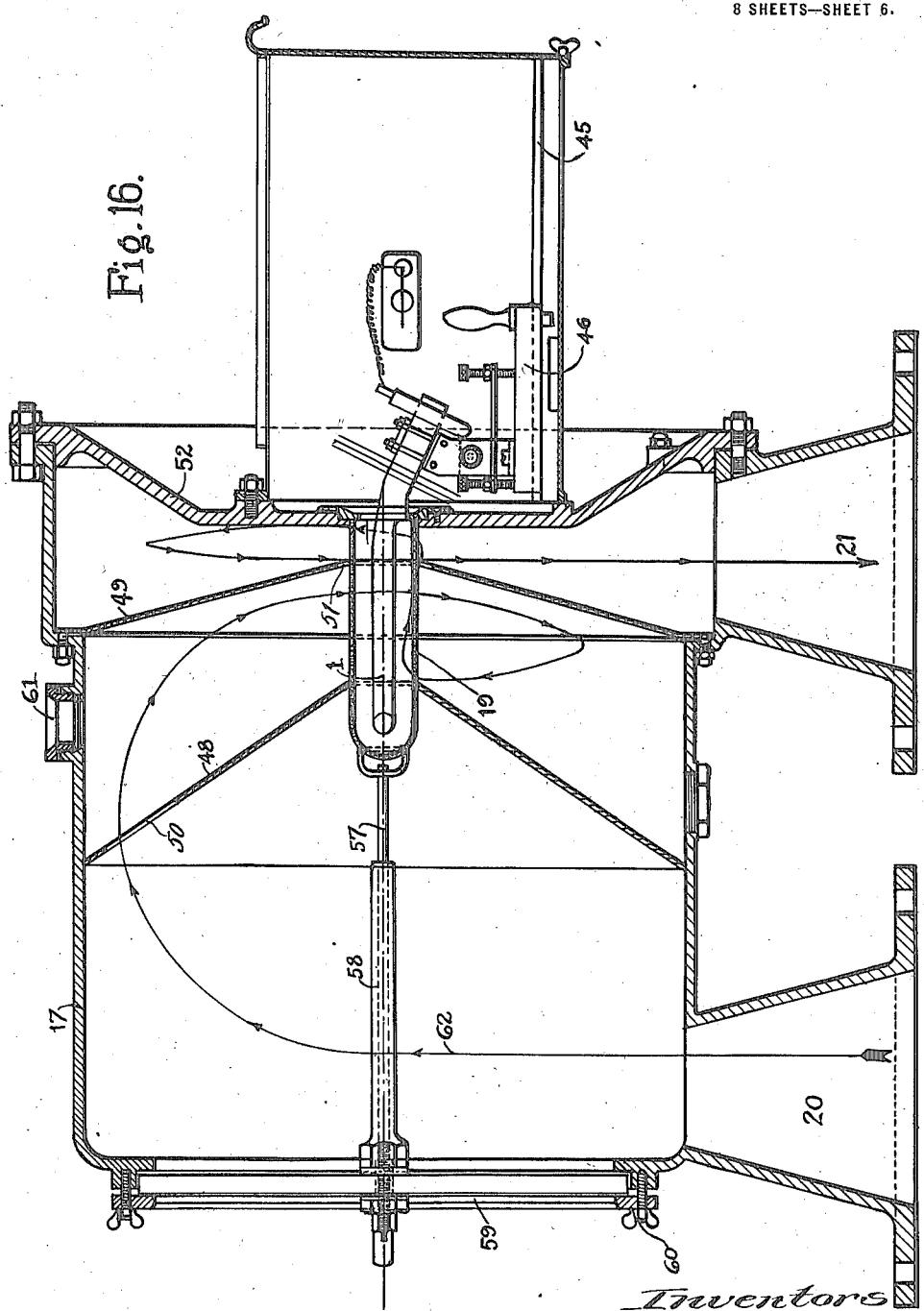

M. VON RECKLINGHAUSEN, A. HELBRONNER & V. HENRI.
STERILIZATION OF LIQUIDS.
APPLICATION FILED DEC. 21, 1912.
1,196,481.
Patented Aug. 29, 1916.
8 SHEETS—SHEET 8.
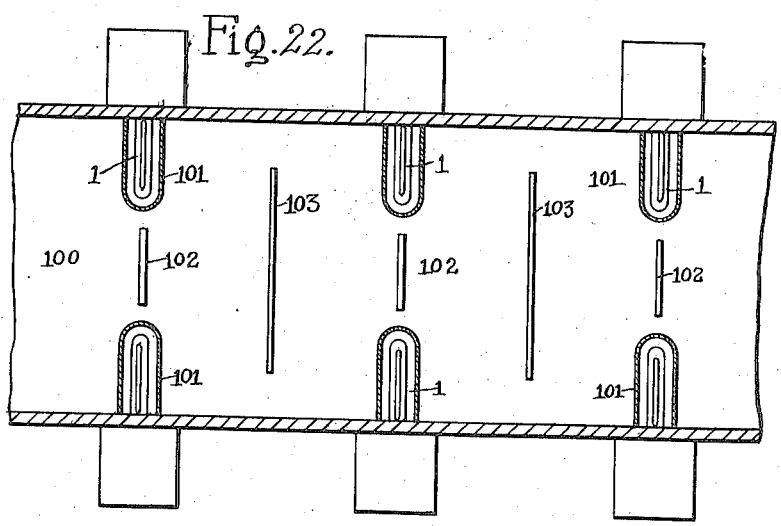

UNITED STATES PATENT OFFICE.

MAX VON RECKLINGHAUSEN, ANDRÉ HELBRONNER, AND VICTOR HENRI, OF PARIS, FRANCE, ASSIGNORS, BY MESNE ASSIGNMENTS, TO THE R. U. V. COMPANY, INC., A CORPORATION OF NEW YORK.

STERILIZATION OF LIQUIDS.

1,196,481. Specification of Letters Patent. Patented Aug. 29, 1916.

Application filed December 21, 1912. Serial No. 738,069.

*To all whom it may concern:*

Be it known that we, MAX VON RECKLINGHAUSEN, a subject of the Emperor of Germany, and ANDRÉ HELBRONNER and VICTOR HENRI, citizens of the Republic of France, all residing at 73 Boulevard Haussmann, Paris, France, have invented new and useful Improvements in the Sterilization of Liquids, of which the following is a specification.

This invention relates to the sterilization, involving the employment of a source of ultra-violet rays, of fluids in large quantities such as are usually required in the sterilization of water, and has for its object to provide improved apparatus for effecting such sterilization.

The primary object of the invention is to provide an improved apparatus for submitting the fluid to be treated to the action of the rays.

It will be understood that the construction of the apparatus is at present considered as embodying the best form of the invention; however, the apparatus in so far as it relates to the processes employed is by no means limited to the particular details herein described.

The vapor electric device or lamp *per se* is not claimed in the present application but forms the subject matter of a divisional application serially numbered 40,036 filed July 15, 1915.

Figure 14:
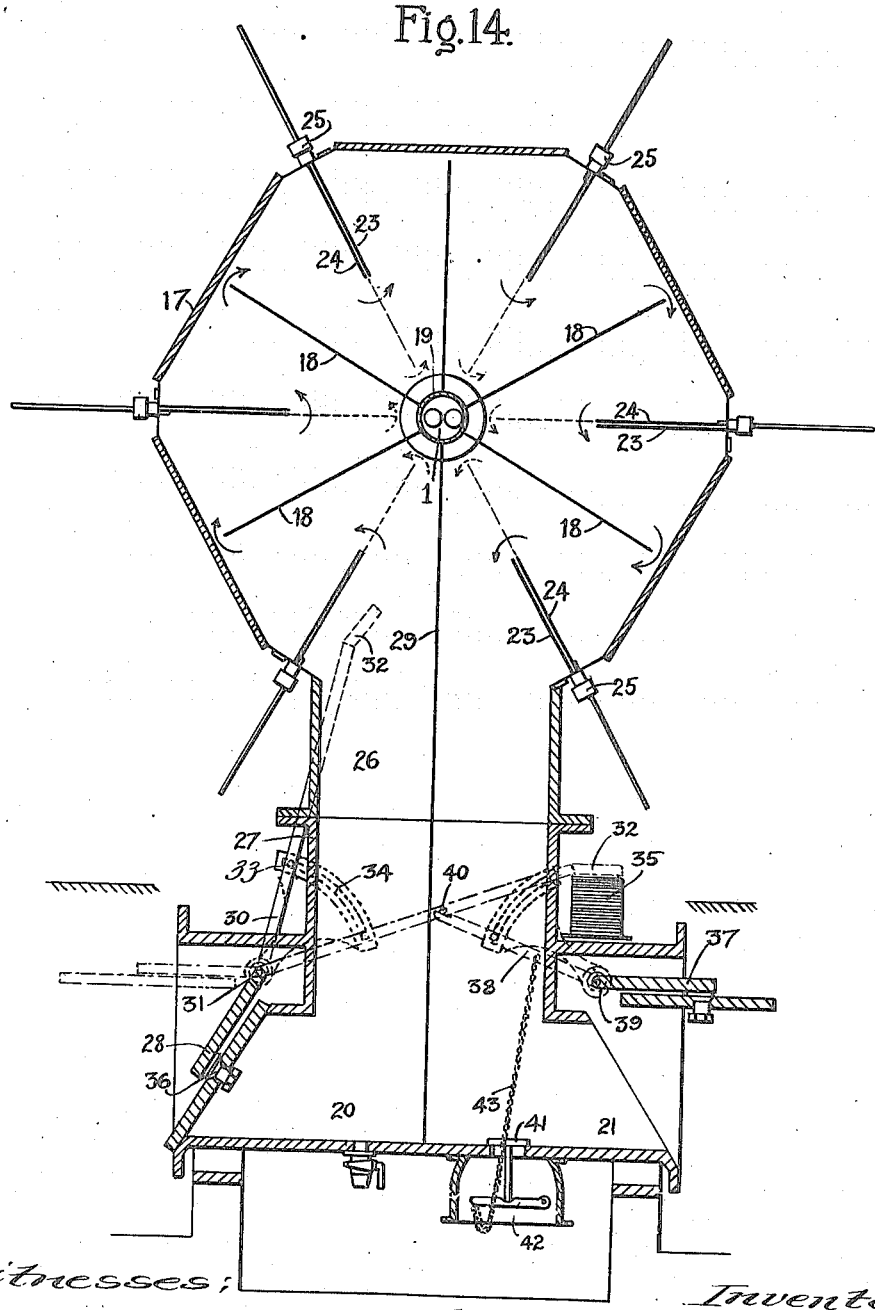
Figure 15:
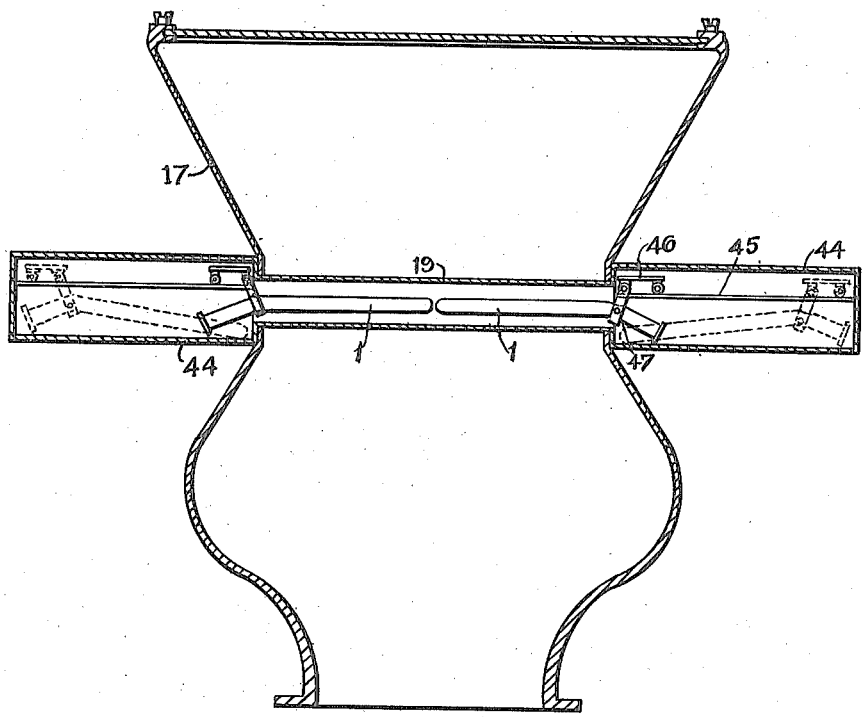

In the accompanying drawings, Figure 1 is a plan view of a simple form of mercury vapor lamp adapted to be employed in connection with the present invention, Fig. 2 being a sectional view in side elevation of the lamp shown in Fig. 1. Figs. 3 and 4 are views in section illustrating a preferred arrangement of cooling device for use when the lamp is employed for sterilizing purposes. Fig. 5 is a plan view illustrating a modification in the arrangement of the terminals of the lamp shown in the preceding figures, Figs. 6 and 7 illustrating further modifications in detail. Figs. 8 and 9 are sectional views showing the lamp in position in simple forms of sterilizing apparatus, Fig. 10 being a plan view of the apparatus shown in Fig. 9. Figs. 11 and 12 are views in sectional elevation and plan respectively of a modified form of sterilizing apparatus somewhat similar to that shown in Figs. 9 and 10. Fig. 13 is a view in sectional elevation illustrating a sterilizing apparatus of large capacity, Figs. 14 and 15 illustrating further details of the same apparatus. Fig. 16 is a view in sectional side elevation illustrating a different type of sterilizing apparatus adapted for dealing with large quantities of liquid, Figs. 17, 18 and 19 being detail views illustrating the arrangement of the baffle plates within the apparatus of Fig. 16. Fig. 20 is a view in sectional elevation showing a complete sterilizing installation embodying a number of separate sterilizing chambers, Fig. 21 being a plan view of the apparatus illustrated in Fig. 20. Fig. 22 illustrates diagrammatically a modified arrangement of an apparatus employing a number of lamps for sterilizing purposes. Fig. 23 is a cross-section of a simple form of packing which may be employed in order to avoid subjecting the quartz envelop to undue pressure at the same time effecting a tight joint between the interior of the container and the atmosphere, Fig. 24 illustrating a modification.

In a mercury vapor lamp the container of which is of a given length and diameter and consumes a given constant amount of electrical energy, there exists a definite relation between the quantity of luminous radiation and the quantity of ultra-violet rays emitted by the lamp. If, however, the form of the container be altered so that instead of being cylindrical with a rectilinear axis the lamp tube is curbed into the form of a U so as to constitute two arms closely adjacent to one another, it is found that the electrical conditions being unchanged the quantity of ultra-violet radiation emitted becomes considerably greater. This phenomenon is probably due to the fact that the two arms of the lamp tube re-act upon one another so as to cause a large quantity of heat to be exchanged between the two by radiation. The U shaped form of container above referred to is obviously not the only form which may be employed in order to produce this increased amount of ultra-violet rays, but in all cases the several portions of the lamp tube must be located sufficiently near together so that an exchange of heat between these portions may occur to a sufficient extent to produce the desired increase in the amount of ultra-violet rays emitted.

A further improvement consists in impressing on the terminals of the lamp a minimum voltage of from 400 to 500 volts, as it has been observed that the increase in the emission of ultra-violet rays due to an increase in the impressed voltage is not proportional to the increase in the latter, but the amount of ultra-violet rays emitted increases much more rapidly than the increase in the voltage impressed on the terminals of the lamp. As an example it may be mentioned that a lamp constructed and operating in accordance with the two conditions above stated, namely, the arrangement of the lamp tube in the form of a U and by impressing a high voltage upon the terminals thereof when operated at a voltage of approximately 400 volts with a current of three amperes, is found to have a bactericidal activity eleven times greater than a mercury vapor lamp having a straight container operated at 150 volts and three amperes, the voltage per centimeter length of the lamp tube being the same in each case. A lamp of this kind is found to be particularly suitable for use in sterilizing apparatus since the two electrodes of the lamp being located adjacent to one another enable the sterilizing apparatus to be constructed and arranged in a very simple and efficient manner, and various forms of construction of a lamp of this kind for the sterilization of fluids are illustrated by way of example in the figures of the drawings.

Referring now to Figs. 1 to 5, the mercury vapor lamp 1 is illustrated as comprising a quartz tube of U shape, the two arms of which, 2, 3, are located closely adjacent to one another and very nearly in contact. The internal form of the lamp 1 is such as to provide a restricted portion 4 adjacent to the negative electrode, while the lamp tube is flattened as indicated at 5 adjacent to the positive electrode. Between the portions 4 and 5 of the lamp tube and the terminals, piston members 6, 7, are provided between which are located fragments of broken glass 8, the conductors for supplying current to the lamp entering through openings 9 into tubular extensions 10 connected to the lower portions of the arms 2 and 3 in which are located the mercury electrodes. In this as in other forms of mercury vapor lamps, it is necessary that the electrodes should be cooled to a certain extent, this cooling being usually effected by lateral tubular extensions or chambers to which the lighting tube of the lamp is connected. In the improved lamp as illustrated in the drawings, however, the electrodes are surrounded by sheets of thin aluminium, as indicated at 11, wings or vanes 12 surrounding the sheets 11 being provided, so arranged as to be as intimately in contact with the surface of the electrodes as possible. The wings or vanes 12 are preferably of conical form so as to facilitate the introduction of the lamp and particularly the entire luminous tube thereof into the interior of the quartz tubes or chambers of the sterilizing apparatus. A copper clamp indicated at 13 is provided which either surrounds each electrode separately or, as shown in Fig. 4, surrounds both of the electrodes and serves to maintain the aluminium sheets 11 in position and to secure the wings or vanes 12 thereto.

The portions of the lamp tube containing the electrodes need not necessarily be arranged parallel to one another but may, as shown in Fig. 1, be arranged at right-angles to the lighting tube or at any other suitable angle, as shown in Fig. 5. It is preferable, however, that the angle formed by the portion of the lighting tube containing the electrode relative to the lighting tube itself, should be greater than a right angle in order to permit the lighting tube to be inserted into the sterilizing apparatus, so as to utilize to the full extent the rays emitted from the lamp.

The cooling of the electrodes can be obtained by other means than the wings or vanes illustrated; for example, the electrodes can be arranged to be cooled by directing a portion of the liquid in the interior of the sterilizer upon any suitable portion of the electrodes, or, if it is desired to avoid the formation of rust, a circulation of distilled water or other suitable liquid may be provided for cooling the electrodes and which is itself cooled by air or in any other similar and suitable manner.

The starting into operation of a lamp having a U shaped tube of considerable length requires a somewhat complicated operation, which consists of the following stages:—1. Removing the lamp from the sterilizing apparatus. 2. Tilting the lamp upward about an axis at right-angles to the lighting tube. This latter movement serves to start the lamp into operation but leaves too large a quantity of mercury on the negative electrode side of the lamp. It is therefore necessary to tilt the lamp again about an axis parallel to that of the luminous tube and at the same time about an axis at right-angles to that of the lighting tube, in order to transfer the excess of mercury from the negative electrode to the positive electrode. It is found, however, in practice that with U shaped lamps operating at low voltage which can be started into operation without the movement of any considerable amount of mercury, that starting can be effected by tilting about a single axis, that is to say, an axis parallel to that of the lighting tube, the tube being tilted until one arm is slightly above the other, so that the mercury forms a continuous stream between the two electrodes, whereupon the lamp is returned to its normal position. It is found that the operating life of these lamps can be considerably increased by providing arrangements intended to determine to some extent the path of the luminous arc, devices of this kind being illustrated in Figs. 6 and 7. It has been observed that the luminous arc naturally tends to take the shortest path from one electrode to the other and it necessarily follows that with a lighting tube of U shape the luminous arc instead of tending to traverse the middle of the tube as in the case of a straight lighting tube, tends to approach that side of the curved portion of the lighting tube which is adjacent to the center of curvature, following in fact the line indicated at 14 in Fig. 6. The inner face of the lighting tube is thus exposed by reason of the extremely high temperature of the luminous arc, to much more rapid deterioration than the other portions of the tube and the corrosion thus effected is found after the expiration of a certain time, to cause the wall of the lighting tube at this point to become somewhat porous and permit the entrance of air, thus rendering the lamp inoperative due to the vacuum being impaired. This disadvantage is obviated by the arrangement shown in Fig. 6 in which the deterioration of this portion of the lighting tube and the injurious effect due to such deterioration is prevented by making that portion 15 of the lighting tube of considerably increased thickness, as shown in the figure. The quartz wall being thickened at this point can readily resist without injury the action of the high temperature of the luminous arc.

A modified arrangement for the same purpose is illustrated in Fig. 7 in which in order to maintain the luminous arc away from the wall 15 of the lighting tube any suitable number of projections 16 are provided; the dotted line indicated at 14 illustrates how the luminous arc is kept at a certain distance away from the wall of the lighting tube.

The arrangements illustrated in Figs. 6 and 7 are evidently only examples of particular methods of causing the luminous arc to be maintained in proper position at the curved portion of the lighting tube and prevent its too close approach to the inner wall thereof, and other methods of accomplishing the same result may evidently be adopted without exceeding the scope of the invention.

Figs. 8 to 15 illustrate the application of the lamps of the form above described to various types of sterilizing apparatus. The latter comprises a casing 17, the interior of which is provided with baffle plates 18, a tubular chamber 19 of quartz or other suitable material being arranged at the center of the chamber within which a mercury vapor lamp 1, constructed as above described, is located. The baffle plates 18 are disposed in such a manner that no portion of the apparatus is shaded thereby from the action of the rays emitted by the lamp, these baffle plates serving to secure an energetic agitation of the liquid, which is necessary for effective sterilization. Since no portion of the apparatus is shaded by the baffle plates it is impossible for colonies of bacteria to become established in any portion of the apparatus so as to reinfect the water or other liquid during the sterilizing process.

The liquid to be sterilized is arranged to be introduced into the apparatus through a pipe 20 arranged tangentially, the outlet pipe 21 being arranged either at the axis of the sterilizing apparatus, as shown in Figs. 8, 9 and 10 or on one side thereof as in the apparatus shown in Figs. 11, 12, 13, and 14. In certain forms of the apparatus (for instance, Figs. 11 and 12) a sluice gate 22 permits the inlet of liquid to be more or less retarded so that the admission of liquid can be varied in accordance with the degree of transparency of the liquid or the output which is desired.

In the apparatus shown in Figs. 13, 14 and 15, each of the baffle plates carried by the casing 17 is constructed in two parts and comprises a fixed baffle plate 23 rigidly attached to the casing, and a movable baffle plate 24 carried by a rod which passes through a stuffing box 25 so as to permit the movable baffle plate 24 to be moved toward or away from the center of the apparatus in such a manner as to vary the cross section of the passage for the flow of liquid. In this apparatus the liquid is given a simple zigzag movement surrounding the lamp and traverses the apparatus around its axis.

Referring now to Fig. 14 it will be seen that the sterilizing chamber 17 is connected by a conduit 26 to a structure 27 on which are mounted the valves 28, 37 controlling the inlet and outlet of the liquid. A partition 29 separates the structure 27 and the conduit 26 into two parts which can only communicate with one another through the sterilizing chamber 17 in such a manner that the liquid can only pass from the inlet valve to the outlet valve after having traversed the sterilizing apparatus. The inlet valve 28 is mounted upon the extremity of an operating lever 30 which is pivotally mounted at 31 and the other extremity of which carries a soft iron armature 32. The lever 30 is provided with a pin 33 adapted to be secured by a set screw at any desired part of a slotted quadrant 34 so as to enable the extent of opening of the valve 28 to be adjusted as desired.

In Fig. 14 the control lever 30 is illustrated as located in its two extreme positions namely as indicated in dotted lines in its shut position and as indicated in dot and dash lines in the position of maximum opening of the valve. The controlling lever 30 is automatically maintained in its open position by means of the attraction exerted by an electro-magnet 35 upon the armature 32.

The valve 28 is provided with a by-pass 36 so as to enable the valve to be readily opened even when the pressure on the exterior surface is high, the liquid entering through the by-pass 36 and equalizing the pressures on the two faces of the valve 28 which can then be readily operated. The outlet valve 37 is arranged in a similar manner being located at one end of a lever 38 pivoted at 39, this lever being engaged by the lever 30 in any convenient manner, as for instance by means of a pin 40 attached to the main operating lever.

At the base of the structure 27 a discharge valve 41 is located carried by a pivoted lever 42, the latter of which is connected by means of a chain 43 to the lever 38.

Located on each side of the apparatus is a casing 44 in the interior of which rails 45 are arranged, upon which runs a small carriage 46 upon which the lamp is supported by means of a suitable supporting stirrup 47 in such a manner as to permit of the lamp being withdrawn from the tubular chamber of the sterilizing apparatus and tilted for starting purposes.

The operation of the apparatus is as follows:—The lamp or lamps are first started into operation by tilting in the usual manner as for instance by displacing the lamp and the small carriage supporting it as above described, the lamps being afterward returned to their normal position within the tubular chamber 19. The valves 28 and 37 being assumed to be closed and the valve 41 consequently open, the valve 28 is opened to a suitable extent by means of the lever 30. The valve 28 is maintained open by the attraction of the electro-magnet 35 as soon as the latter is energized by the passage of current through the lamp. The liquid to be sterilized at first leaves the apparatus by means of the valve 41, the outlet valve 37 being then opened to an equal extent, the lever 38 being operated by means of the connection 40 between this lever and the lever 30. The circulation of the liquid within the apparatus is then adjusted by means of the movable baffles 23, the liquid being caused to approach and recede from the lamp 1 while passing around the baffles 18, 23 and 24, the sterilizing liquid leaving the apparatus by means of the outlet valve 37. When it is desired to discontinue the sterilizing operation it is only necessary to interrupt the current circuit of the lamp, whereupon the valve 28 falls under its own weight thereby releasing the valve 37. As the valves move to their closed position, the lever 38 exerts a pull on the chain 43 and opens the valve 41, permitting the apparatus to be automatically emptied.

The apparatus above described can be modified in various ways as regards its details of construction, for instance the lamp 1 can be mounted in a stationary casing the outer surface of which is adapted to engage with the fixed baffles 18. If desired, more than one electro-magnet may be provided, each of which can be operated by the current traversing a separate lamp where a number of these are employed, the electro-magnets being arranged to be insufficiently powerful to maintain the valves open if one or more of the lamps is extinguished. Furthermore if desired the tubular lamp chamber may be omitted and the lamp operated directly in contact with the liquid to be sterilized.

The apparatus above described may be either constructed of cast or stamped or embossed metal, the interior surface of the casing being preferably plated with tin.

It will now be apparent that an arrangement of this description materially simplifies the operation of the apparatus as a whole, inasmuch as failure on the part of the lamp either intentionally or otherwise automatically cuts off the supply of fluid to the sterilizing chamber and also permits the partly sterilized fluid which has passed through the chamber to escape to waste. It will be understood, however, that various other devices may be substituted for those described with reference to these figures operating on the same general principles.

Figure 17:
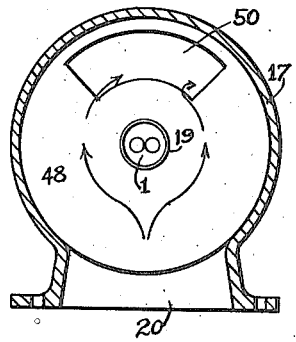
Figure 18:
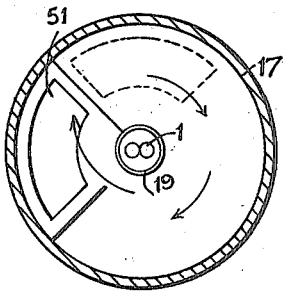
Figure 19:
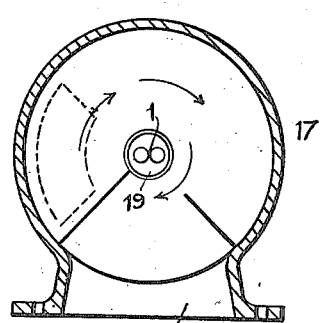
Figure 20:
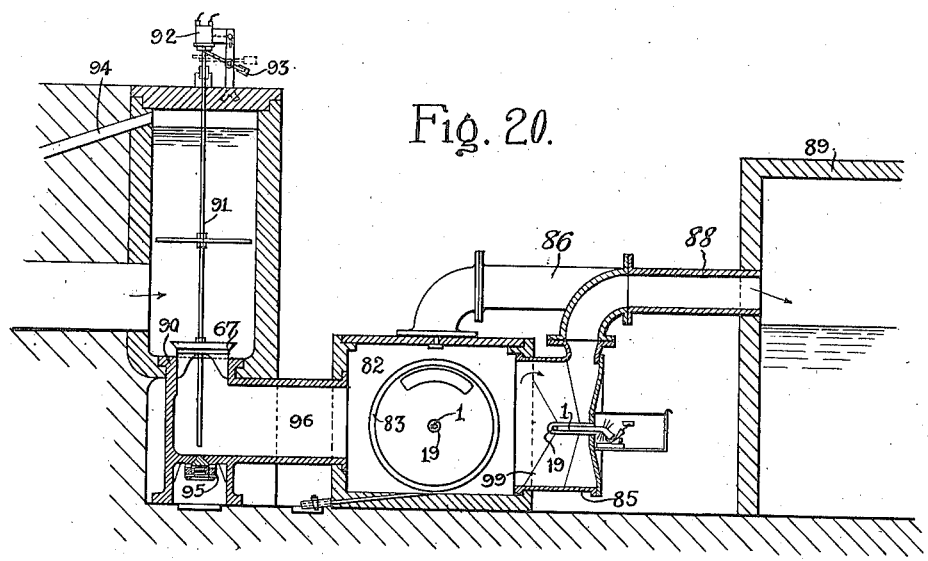

Referring now to Fig. 16 of the drawings, the sterilizing chamber 17 is shown as divided into a number of compartments by means of conical diaphragms 48 and 49 which are provided with openings 50, 51 as will be clearly seen from an inspection of Figs. 17, 18 and 19 in order to insure the liquid entering the sterilizing chamber through the inlet passage 20 following a tortuous path prior to its exit from the outlet passage 21. The lamp 1, which is surrounded by a quartz lamp chamber 19 as described with reference to the preceding figures, is supported upon a traveling carrier 46 so supported upon a rail or rails 45 that a displacement of the lamp can be readily effected in order to start the lamp into operation. The quartz lamp chamber 19 may be secured in the end piece 52 of the sterilizing chamber by means of a joint such as that illustrated in Figs. 23 or 24, so designed as to prevent the quartz chamber from being subjected to undue pressure, at the same time effecting a tight joint between the interior of the sterilizing chamber and the atmosphere.

The packing illustrated in Fig. 23 comprises a soft ring 53 of rubber or other suitable material interposed between the conical surface formed in the end piece 52 of the sterilizing chamber and the inwardly projecting flange of a packing ring 54 secured to the end piece 52 by means of suitable securing bolts 55.

In the arrangement described in Fig. 24 the edge of the quartz lamp chamber is supported by the packing ring 54, being arranged to project within a slot formed therein and provided with a suitable packing ring 56, an additional packing ring 54a being interposed between the packing ring 54 and the outer surface of the end piece 52 as clearly indicated in this figure. The opposite end of the quartz lamp chamber is supported by means of a bracket 57 attached to a rod 58, the outer end of which projects through a glass plate 59 constituting a window at that end of the sterilizing chamber and suitably secured to the body portion of the chamber by means of bolts 60 thereby permitting a ready inspection of the interior of the sterilizing chamber. An additional window 61 is also provided at the top of the sterilizing chamber, this window in this instance being composed of quartz for the purpose of enabling photometer measurements to be taken. As will be apparent from an examination of this figure studying the flow of liquid through the sterilizing chamber as indicated by the arrow 62, the liquid in passing from one compartment to the other, the compartments as above explained being constituted by the space between the diaphragms 48 and 49, is caused to change its direction of flow, the liquid being nearer to the lamp in certain portions of its path than in other portions. This arrangement in the case of large sterilizing systems provides a particularly suitable construction although it will be understood that any other arrangement of baffling members may be provided in place of those referred to.

Figure 21:
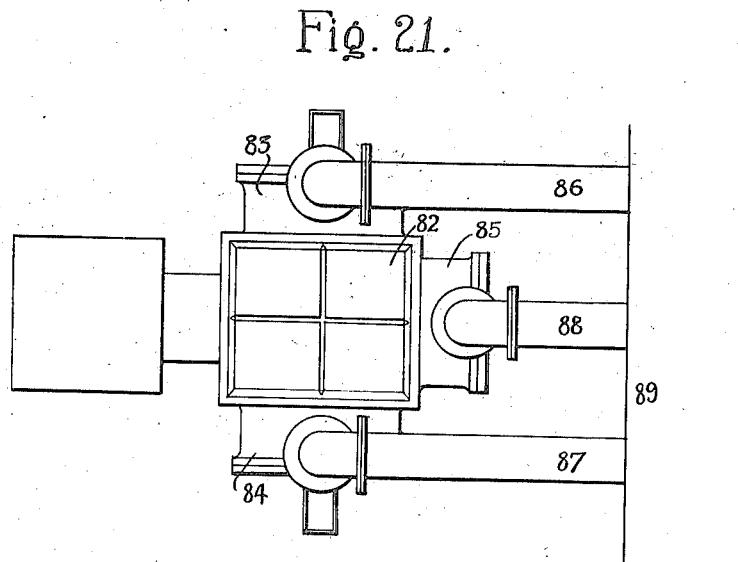

Referring now to Figs. 20 and 21, in which a number of sterilizing chambers are employed for treating the liquid supplied from a receptacle common to all of said chambers, the main receptacle is shown at 82 connected to the interior of three sterilizing chambers 83, 84 and 85, the outlet passages 86, 87 and 88 respectively leading to a main tank or cistern 89. The supply of liquid to the interior of the sterilizing chambers 83, 84 and 85 is controlled by a valve 67 located in a vertical conduit 90 leading to the receptacle 82. The valve 67 is provided with a stem 91. The position of the valve is controlled by an electro-magnet 92 which operates in conjunction with a counterweight 93, the electro-magnet when energized holding the valve 67 open and when deënergized permitting the valve 67 to close by its own weight and the pressure of the liquid acting thereon, this occurring whenever the lamp is put out of operation. The vertical conduit 90 is provided with an overflow passage 94 located at the top of this passage so that liquid supplied to the interior of the vertical passage 90 when the valve 67 is closed, flows through the passage 94. The extension of the stem 91 on the underside of the valve 67 is adapted, when the valve 67 is in its closed position, to move a spring pressed valve 95 from its seat thus permitting any liquid remaining in the sterilizing chamber and in the passage 96 connecting the vertical passage 90 therewith, to pass to waste when the valve 67 is closed. The sterilizing chamber 83 which contains a quartz lamp container 19 and a lamp 1 as common to the other constructions, is connected to the reservoir or cistern 89 through a pipe 87 and the sterilizing chamber 85 is similarly connected through a pipe 88, the third sterilizing chamber 84 being connected by a similar pipe not shown in this figure. Baffling members 99 are shown in the sterilizing chamber 85 constructed as already described with reference to Fig. 16, although if desired these baffling members may be replaced by any other form of device for accomplishing the same purpose.

Referring now to Fig. 22, a simple form of sterilizing apparatus suitable for dealing with large quantities of liquid such for instance as a water main, is illustrated, a number of lamps being shown projecting within the interior of the main conduit 100 through which the liquid passes. These lamps may be started into operation by being removed bodily from the pockets 101 into which they project, the rays emitted by the lamps acting upon the water during its passage through the conduit. If desired a series of baffling members 102 and 103 may be provided in order to insure the agitation of the water during its passage past the lamps, these baffling members being composed for instance of flat bands or projections suitably attached or formed integral with the conduit 100 interposed between oppositely arranged pairs or sets of lamps and between longitudinally adjacent groups of lamps. In place of the flat baffle members conical members such as those illustrated in Fig. 16 may be employed.

Although a number of forms of apparatus suitable for dealing with liquids in large quantities as above described, and certain elements of the separate constructions are found in practice to be particularly suitable for the purpose for which they are intended, it will be seen that the elements described with reference to certain of the figures are equally applicable in place of or in addition to similar elements described with reference to certain of the other figures, consequently it will be understood that a combination of the various elements to achieve the desired result may be employed without exceeding the scope of the invention which is only regarded as limited by the appended claims.

What we claim is:—

1. In a sterilizing apparatus, the combination with a vapor electric lamp, of a sterilizing chamber having within it a tube receiving only the luminous portion of the lamp which extends into the chamber from one side only.

2. In a sterilizing apparatus, the combination with a vapor electric lamp having a narrow luminous portion and enlarged electrode portions, both at one end of the luminous portion, of a sterilizing chamber containing within it only the narrow luminous portion of the lamp and having the enlarged electrode portions thereof located exteriorly.

3. In a sterilizing apparatus, the combination with a vapor electric lamp having a luminous portion and enlarged non-luminous electrode portions at one end thereof, of a sterilizing chamber wholly containing the luminous portion of the lamp and having the non-luminous enlarged portions located exteriorly thereof.

4. In a sterilizing apparatus, the combination with a vapor electric lamp having a luminous portion and enlarged electrode portions at one end thereof, of a sterilizing chamber having therein a tube containing the luminous portion of the lamp, the electrode portions thereof being located exteriorly of the tube and adjacent to one end thereof.

5. In a sterilizing apparatus, the combination with a vapor electric lamp having a luminous portion and enlarged non-luminous portions at one end thereof, of a sterilizing chamber having a tube therein open at its outer end, said tube containing the luminous portion of the lamp and having the enlarged non-luminous portions located at a point adjacent but exterior to the open outer end of the tube.

In testimony whereof we have signed our names to this specification in the presence of two subscribing witnesses.

MAX von RECKLINGHAUSEN.
ANDRÉ HELBRONNER.
VICTOR HENRI.

Witnesses:
   GEORGE E. LIGHT,
   LUCIEN MEMMINGER.